United States Patent
Hsieh

(10) Patent No.: US 9,046,433 B2
(45) Date of Patent: Jun. 2, 2015

(54) THREADED MEMBER CAPABLE OF DETECTING TENSION

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 14/161,307

(22) Filed: Jan. 22, 2014

(65) Prior Publication Data

US 2014/0260652 A1   Sep. 18, 2014

(30) Foreign Application Priority Data

Mar. 12, 2013  (TW) .............................. 102108681 A

(51) Int. Cl.
*F16B 31/02* (2006.01)
*G01L 5/24* (2006.01)

(52) U.S. Cl.
CPC . *G01L 5/24* (2013.01); *F16B 31/02* (2013.01); *F16B 2031/022* (2013.01)

(58) Field of Classification Search
USPC .......................................................... 73/761
See application file for complete search history.

(56) References Cited

U.S. PATENT DOCUMENTS

| | | | | |
|---|---|---|---|---|
| 3,602,186 A | * | 8/1971 | Popenoe | 411/13 |
| 3,638,479 A | * | 2/1972 | Boutet | 73/761 |
| 3,718,066 A | * | 2/1973 | Dally | 411/14 |
| 3,776,031 A | * | 12/1973 | Trigg | 116/225 |
| 3,799,108 A | * | 3/1974 | Mosow | 411/13 |
| 3,812,758 A | * | 5/1974 | Bossler, Jr. | 411/14 |
| 3,850,133 A | * | 11/1974 | Johnson | 116/212 |
| 4,254,354 A | * | 3/1981 | Keem | 310/329 |
| 4,569,229 A | * | 2/1986 | de Halleux | 73/597 |
| 4,574,328 A | * | 3/1986 | Maier | 361/284 |
| 4,846,001 A | * | 7/1989 | Kibblewhite | 73/761 |
| 4,909,685 A | * | 3/1990 | Hirst | 411/9 |
| 7,001,123 B2 | * | 2/2006 | Kersten | 411/8 |
| 8,156,820 B2 | * | 4/2012 | Dral et al. | 73/761 |
| 8,453,519 B2 | * | 6/2013 | Zhang | 73/862.08 |
| 8,666,682 B2 | * | 3/2014 | LaVigne et al. | 702/41 |
| 2011/0167890 A1 | * | 7/2011 | Cottogni | 73/1.09 |
| 2011/0239729 A1 | * | 10/2011 | Chiapuzzi | 73/1.09 |
| 2012/0210767 A1 | * | 8/2012 | Sue et al. | 73/1.09 |
| 2014/0123725 A1 | * | 5/2014 | Kasprick | 73/1.09 |

* cited by examiner

*Primary Examiner* — Lisa Caputo
*Assistant Examiner* — Jamel Williams
(74) *Attorney, Agent, or Firm* — Guice Patents PLLC

(57) ABSTRACT

A threaded member capable of detecting tension includes a sensor component. A receiving space is formed in the threaded member. The sensor component has a flexible member and a sensor. The sensor is disposed on the flexible member. The sensor component is disposed in the receiving space of the threaded member and preset in a compressed/flexed state in an axial/longitudinal direction of the threaded member. When an article is tightened with the threaded member, the threaded member is tensioned to change the flexion of the flexible member. At this time, the sensor can detect and find the tension of the threaded member to achieve the tightening force applied to the threaded member.

19 Claims, 7 Drawing Sheets

US 9,046,433 B2

THREADED MEMBER CAPABLE OF DETECTING TENSION

BACKGROUND OF THE INVENTION

1. Field of the Invention

The present invention relates generally to a member for connecting articles, and more particularly to a threaded member, which is capable of detecting the tension of the threaded member when tightening an article with the threaded member.

2. Description of the Related Art

Bolts and nuts are often seen threaded members and widely used in various fields for fixedly connecting two or more articles with each other. By means of tightening the bolts, the articles can be fixed with each other.

Many parts of sophisticated equipment and large-scale buildings such as bridges, reservoirs and hardware of power plants are connected by threaded members. Such sophisticated equipment and buildings not only require that the parts be fixedly connected together, but also require that the parts be tightened by precise tightening force. In the case that the threaded members are under-tightened or over-tightened, not only the design requirement cannot be satisfied, but also the use effect and security of the buildings and equipment will be affected.

In order to find the tightening force/tightening torque applied to the threaded member for tightening an article, conventionally, a sensor is disposed on the bolt. When the article is tightened with a bolt, the sensor can detect the deformation of the bolt to achieve the tightening force/tightening torque applied to the bolt. In this case, an operator can control the tightening force applied to the bolt.

The above technique is able to detect the deformation of the threaded member to find the tightening force applied to the threaded member according to the relationship between the deformation and the tightening force. The present invention provides another detection technique for detecting the tightening extent of the threaded member.

SUMMARY OF THE INVENTION

It is therefore a primary object of the present invention to provide a threaded member, which can detect the tension applied to the threaded member so as to find the tightening force applied to the threaded member.

It is a further object of the present invention to provide the above threaded member having a sensor component. The sensor component is preset in a compressed state for detecting the tension applied to the threaded member.

To achieve the above and other objects, the threaded member of the present invention includes a sensor component for detecting the tension applied to the threaded member.

The threaded member has an axial/longitudinal direction. A receiving space is formed in the threaded member. The sensor component has a flexible member and a sensor disposed on the flexible member for detecting the flexion of the flexible member. The sensor component is disposed in the receiving space of the threaded member and preset in a compressed/flexed state in the axial/longitudinal direction of the threaded member.

According to the above arrangement, when an article is tightened with the threaded member, the threaded member is tensioned in its axial/longitudinal direction and the flexion of the flexible member is changed along with the extension of the threaded member. By means of detecting the change of the flexion of the flexible member, the sensor can find the tension applied to the threaded member so as to achieve the tightening torque/tightening torque applied to the threaded member.

The present invention can be best understood through the following description and accompanying drawings, wherein:

DETAILED DESCRIPTION OF THE PREFERRED EMBODIMENTS

Figure 1:
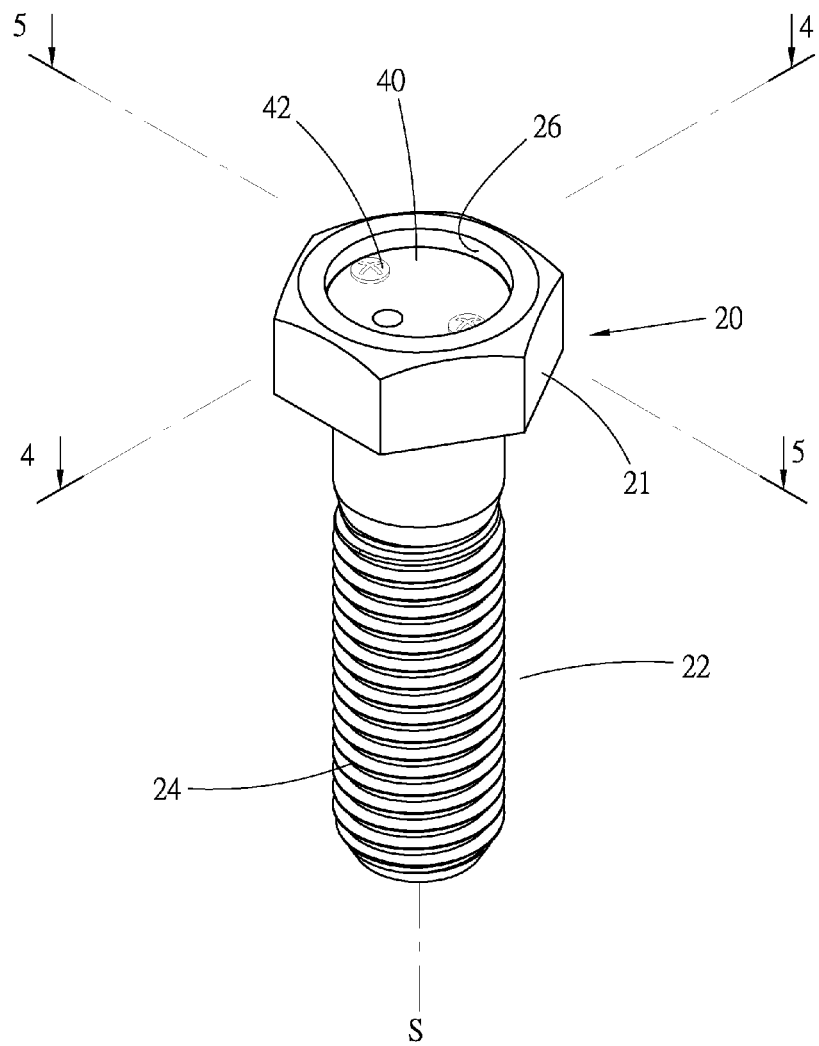
FIG. 1 is a perspective view of a first embodiment of the threaded member of the present invention.
Figure 2:
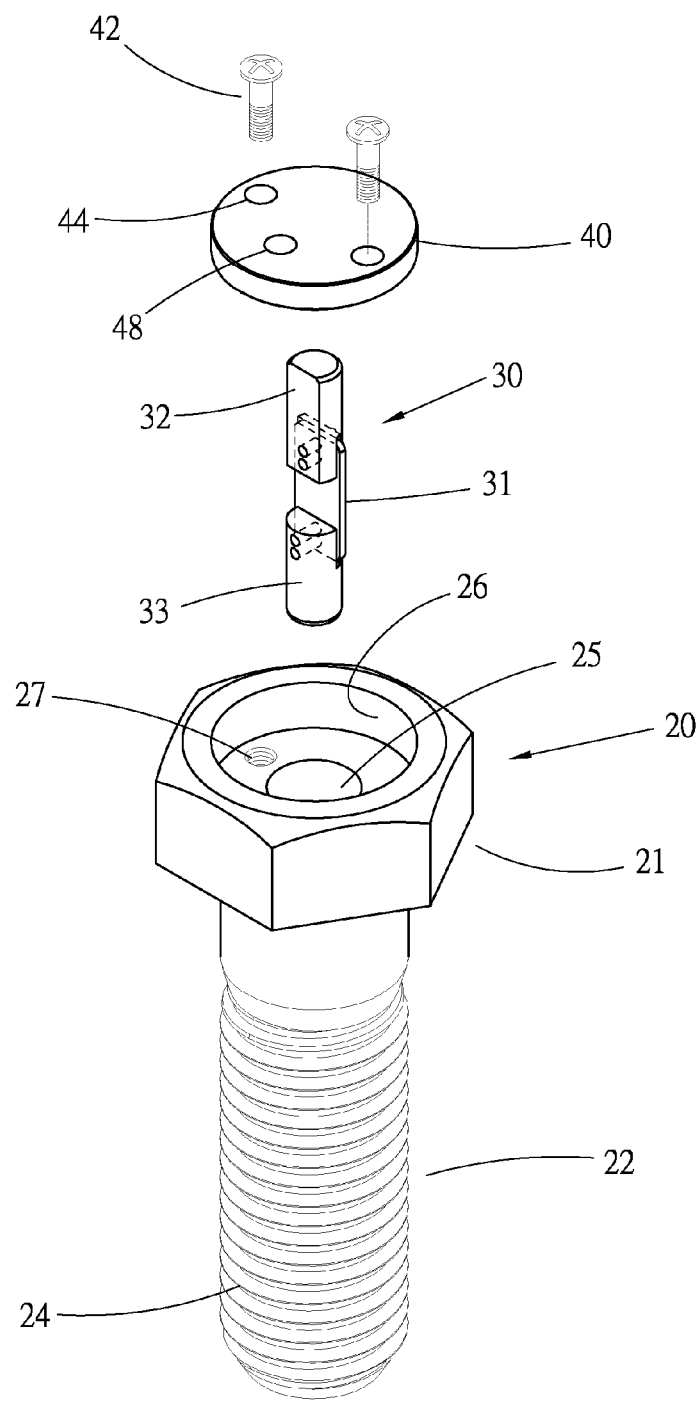
FIG. 2 is a perspective exploded view according to FIG. 1.

Please refer to FIGS. 1 and 2. According to a first embodiment, the threaded member 20 of the present invention is installed with a sensor component 30 for detecting the tension of the threaded member. The threaded member can be a bolt or a nut. In this embodiment, the threaded member is a bolt as an example. The threaded member 20 has a head section 21 and a threaded rod section 22 disposed under a bottom face of the head section 21. A hand tool such as a wrench can be fitted onto or engaged with the head section 21 to wrench the threaded member. The configuration of the head section 21 is not limited to that of this embodiment. The head section 21 can be made with different configurations in adaptation to different types of wrenches or hand tools. A thread 24 is formed on outer circumference of the threaded rod section 22. The threaded member 20 has an axial/longitudinal direction S. The thread 24 is formed on the threaded rod section 22 in the axial/longitudinal direction S of the threaded member 20.

Figure 4:
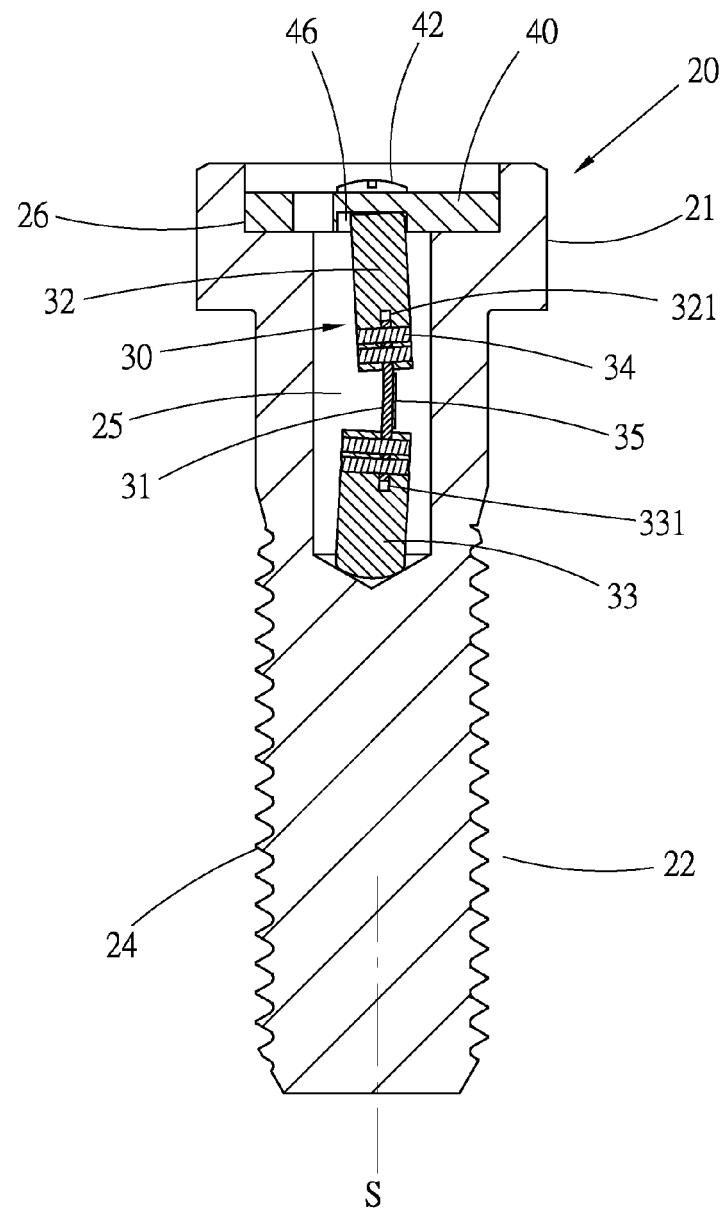
FIG. 4 is a longitudinal sectional view taken along line 4-4 of FIG. 1.

A receiving space 25 is formed in the threaded member 20 as shown in FIG. 4. In this embodiment, the receiving space 25 is an elongated space inward recessed from a top face of the head section 21 of the threaded member 20 and downward extending to the threaded rod section 22. The receiving space 25 has a top end/open end and a bottom end/closed end. The length between the top end and the bottom end is larger than the width of the receiving space 25. The longitudinal direction of the receiving space 25 is positioned in the axial/longitudinal direction S of the threaded member 20, but not limited to be parallel to the axial/longitudinal direction S. A recess 26 is formed on the top face of the head section 21 in communication with the top end/open end of the receiving space 25.

Figure 5:
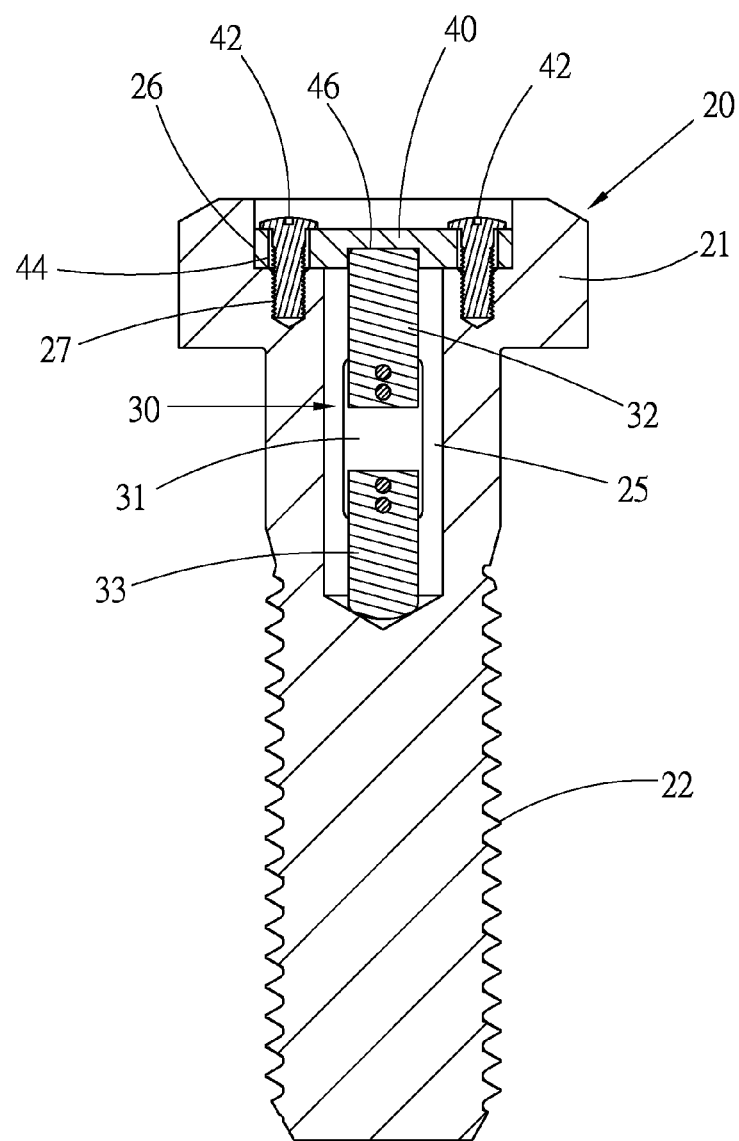
FIG. 5 is a longitudinal sectional view taken along line 5-5 of FIG. 1.

A cap body 40 is fixedly disposed in the recess 26 of the threaded member 20 by means of several fixing members 42 for blocking the open end/top end of the receiving space 25 as a top wall of the receiving space 25. Please refer to FIGS. 2 and 5. A bottom wall of the recess 26 is formed with two connection holes 27 such as threaded holes. Two fixing members 42 such as small screws are passed through the perforations 44 of the cap body 40 and screwed into the two connection holes 27 to fix the cap body 40. It should be noted that alternatively, the receiving space 25 can be inward recessed from the bottom end of the threaded rod section 22 of the threaded member 20 and the cap body 40 is fixedly disposed at the bottom end of the threaded member to block the bottom end/open end of the receiving space 25 as a bottom wall of the receiving space.

Figure 3:
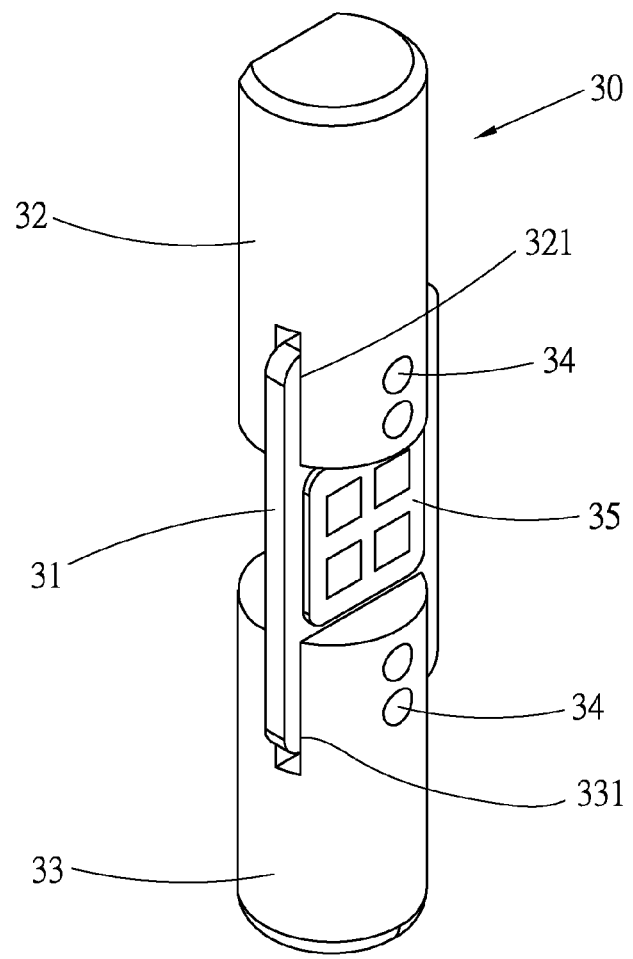
FIG. 3 is a perspective view of the sensor component of the present invention.

Please now refer to FIGS. 2 and 3. The sensor component 30 has a flexible member 31 and a sensor 35. The flexible member 31 is a flexible body preferably in the form of a plate body such as a metal plate, which is sensitive to flexion or potential change. The sensor component 30 further includes an upper contact member 32 and a lower contact member 33 in cylindrical form. The upper and lower contact members 32, 33 are connected with top end and bottom end of the flexible member 31. To speak more specifically, the top end of the flexible member 31 is inserted in an insertion split 321 formed at bottom end of the upper contact member 32. The flexible member 31 is fixedly connected with the upper contact member 32 by means of two connection members 34 (such as small insertion pins or small rivets). Similarly, the bottom end of the flexible member 31 is inserted in an insertion split 331 formed at top end of the lower contact member 33. The flexible member 31 is fixedly connected with the lower contact member 33 by means of two connection members 34.

The sensor 35 is disposed at the flexible member 31 for detecting the flexion of the flexible member. The sensor can be a tension gauge, a strain gauge or a sensor inbuilt with a sensation chip. The sensor can wiredly or wirelessly transmit the detected data by way of, but not limited to, infrared, Bluetooth or electromagnetic wave.

The sensor component 30 is mounted in the receiving space 25 of the threaded member 20 as shown in FIG. 4. The cap body 40 is fixedly disposed on the threaded member 20 to block the receiving space. The upper and lower contact members 32, 33 respectively abut against the wall faces of two ends of the receiving space 25, that is, the top wall (the cap body 40) and the bottom wall of the receiving space. The bottom face of the cap body 40 is recessed to form a locating section 46 for the top end of the upper contact member 32 to extend into the locating section 46 and be located therein. The bottom wall of the receiving space 25 is recessed to form a conic locating section for locating the bottom end of the lower contact member 33. In this embodiment, after the cap body 40 is fixedly connected with the threaded member 20, the cap body presses the upper contact member 32 to compress the sensor component 30 in the receiving space 25, whereby the flexible member 31 is in a flexed state in the axial/longitudinal direction of the threaded member 20. Therefore, in normal state, without any external force applied to the threaded member 20, the flexible member 31 is compressed and in a flexed state. Under such circumstance, the value detected by the sensor 35 is set as a reference value such as a zeroed torque value.

Figure 6:
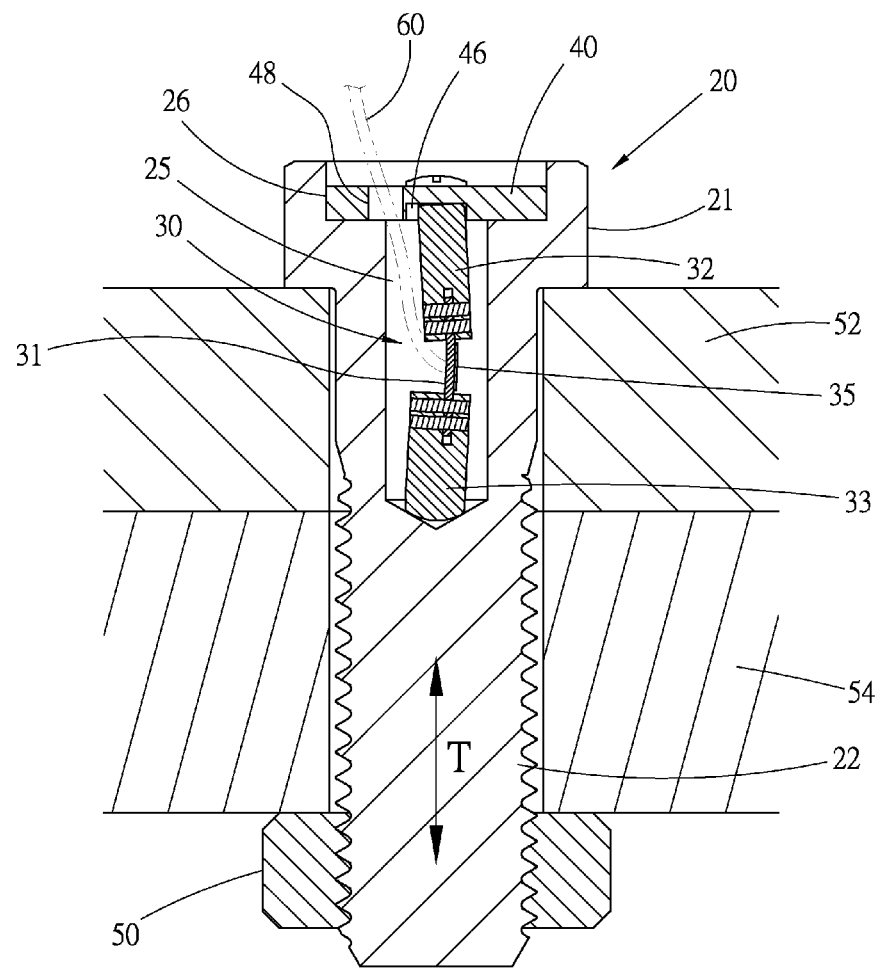
FIG. 6 is a longitudinal sectional view showing the use of the threaded member of the present invention.

Please now refer to FIG. 6. The threaded rod section 22 of the threaded member 20 is screwed into a threaded hole of a specific part (not shown) for fixing at least one fixed article. Alternatively, the threaded rod section 22 is screwed into a nut 50 to fix at least two fixed articles 52, 54. An operator can tighten the threaded member 20 to fix the fixed articles. When tightened, the threaded member 20 is tensioned in the axial/longitudinal direction of the threaded member 20 by a tension T. The tension T is in direct proportion to the tightening force of the threaded member. Under such circumstance, the sensor component 30 (the upper and lower contact members and the flexible member) will stretch along with the extension of the threaded member 20, whereby the flexion of the flexible member 31 is reduced. By means of detecting the change of the flexion of the flexible member 31, the sensor 35 can detect the tension T of the threaded member 20 and convert the tension into the tightening force/tightening torque of the threaded member 20 and transmit the detected tightening force/tightening torque to a receiver or a display for the operator to know the tightening force of the threaded member. The conversion of the tension of the threaded member into the tightening force can be directly completed by the sensor 35 or performed by the receiver. After the fixed articles are tightened with the threaded member, the operator can know the tightening extent of the threaded member and monitor whether the tightening force of the threaded member is changed, for example, reduced.

As aforesaid, the sensor 35 can wirelessly transmit the detected value to the operator. Alternatively, the sensor 35 can wiredly transmit the detected value to the operator. In case of wired transmission, as shown in FIG. 6, at least one wire 60 is connected with the sensor 35, while the other end of the wire 60 is conducted out through a wire hole 48 of the cap body 40 to connect with a display or a receiver.

Figure 7:
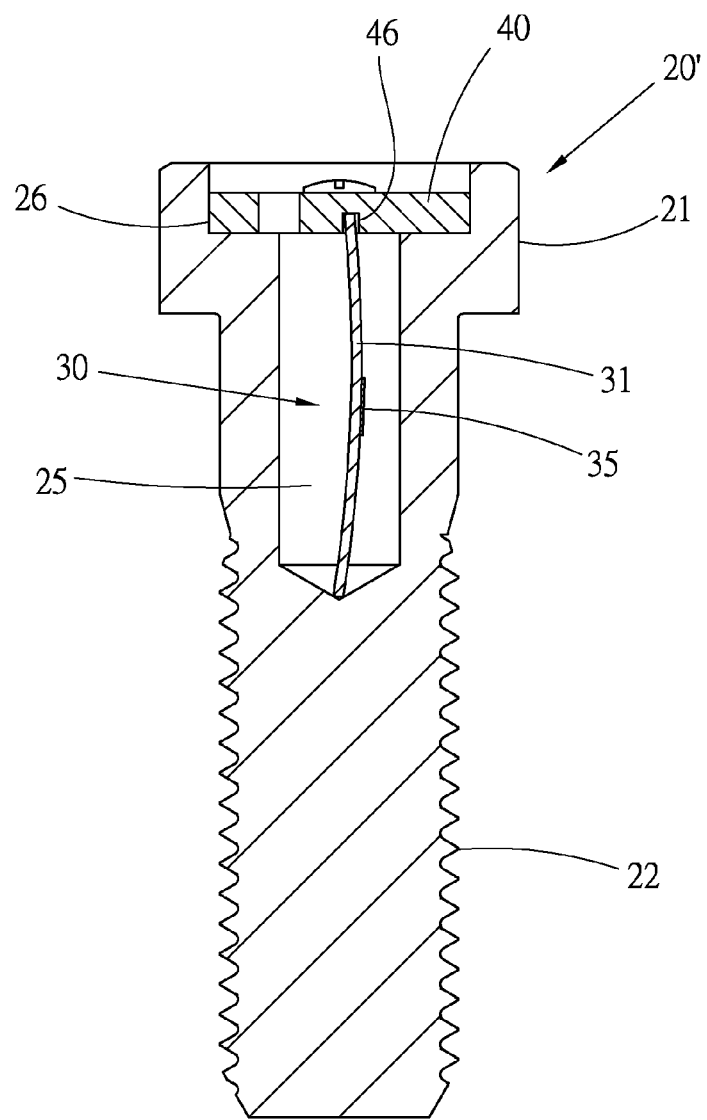
FIG. 7 is a longitudinal sectional view of a second embodiment of the threaded member of the present invention.

FIG. 7 shows a second embodiment of the threaded member 20' of the present invention. The same components of the second embodiment as the first embodiment are denoted with the same reference numerals. The second embodiment is substantially identical to the first embodiment in structure. The second embodiment is different from the first embodiment in that the sensor component 30 only includes a flexible member 31 and a sensor 35 disposed on the flexible member 31. When the sensor component 30 is mounted in the receiving space 25, two ends of the flexible member 31 respectively abut against the top wall (the cap body 40) and the bottom wall of the receiving space 25, whereby the flexible member 31 is in a compressed state. Two ends of the flexible member 31 are located in the locating sections 46. When the threaded member 20' is tensioned, the sensor 35 can detect the change of the flexion of the flexible member 31.

According to the above arrangement, a sensor component is disposed in the threaded member of the present invention. The flexible member of the sensor component is preset in a flexed state. When the threaded member is tensioned, the flexion of the flexible member is changed, whereby the sensor can detect the tension of the threaded member to find the tightening torque thereof. In comparison with the conventional technique in which the compression/deformation of the bolt or nut is detected, the present invention can more sensitively and precisely detect and find the tightening torque applied to the threaded member.

The above embodiments are only used to illustrate the present invention, not intended to limit the scope thereof. Many modifications of the above embodiments can be made without departing from the spirit of the present invention.

What is claimed is:

1. A threaded member capable of detecting tension, comprising: a sensor component installed in the threaded member, wherein:
   the threaded member having an axial/longitudinal direction, a thread being formed on the threaded member in the axial/longitudinal direction of the threaded member; and
   a receiving space being formed in the threaded member and extending below a top of the thread;
   the sensor component having a flexible member and a sensor, the flexible member being a flexible body, the sensor being disposed on the flexible member for detecting the flexion thereof, the sensor component being located in the receiving space of the threaded member, positioned in a flexed state, and positioned in the axial/longitudinal direction of the threaded member.

2. The threaded member as claimed in claim 1, wherein the sensor component has two ends, in the axial/longitudinal direction of the threaded member, the two ends of the sensor component respectively abutting against wall faces of two ends of the receiving space, whereby the flexible member is in a flexed state.

3. The threaded member as claimed in claim 2, wherein the receiving space is inward recessed from one end of the threaded member in the axial/longitudinal direction of the threaded member, the receiving space having a closed end and an open end; a cap body being disposed in the threaded member to block the open end of the receiving space; two ends of the sensor component respectively abutting against the closed end of the receiving space and the cap body.

4. The threaded member as claimed in claim 2, wherein the sensor component further includes two contact members; two ends of the flexible member being respectively fixedly connected with the two contact members, the two contact members of the sensor component respectively abutting against the wall faces of two ends of the receiving space.

5. The threaded member as claimed in claim 3, wherein the sensor component further includes two contact members; two ends of the flexible member being respectively fixedly connected with the two contact members, the two contact members of the sensor component respectively abutting against the wall faces of two ends of the receiving space.

6. The threaded member as claimed in claim 2, wherein two ends of the flexible member respectively abut against the wall faces of two ends of the receiving space.

7. The threaded member as claimed in claim 3, wherein two ends of the flexible member respectively abut against the wall faces of two ends of the receiving space.

8. The threaded member as claimed in claim 3, wherein a recess is formed on one end of the threaded member and the cap body is disposed in the recess.

9. The threaded member as claimed in claim 3, wherein the cap body is formed with a wire hole for at least one wire to pass through, one end of the wire being connected with the sensor, while the other end of the wire being conducted out of the threaded member through the wire hole of the cap body.

10. The threaded member as claimed in claim 8, wherein the cap body is formed with a wire hole for at least one wire to pass through, one end of the wire being connected with the sensor, while the other end of the wire being conducted out of the threaded member through the wire hole of the cap body.

11. The threaded member as claimed in claim 1, wherein the threaded member is a bolt having a head section and a threaded rod section disposed under a bottom face of the head section, the thread being formed on a circumference of the threaded rod section, the receiving space being an elongated space, the receiving space having a longitudinal direction positioned in the axial/longitudinal direction of the threaded member.

12. The threaded member as claimed in claim 2, wherein the threaded member is a bolt having a head section and a threaded rod section disposed under a bottom face of the head section, the thread being formed on a circumference of the threaded rod section, the receiving space being an elongated space, the receiving space having a longitudinal direction positioned in the axial/longitudinal direction of the threaded member.

13. The threaded member as claimed in claim 3, wherein the threaded member is a bolt having a head section and a threaded rod section disposed under a bottom face of the head section, the thread being formed on a circumference of the threaded rod section, the receiving space being an elongated space, the receiving space having a longitudinal direction positioned in the axial/longitudinal direction of the threaded member.

14. The threaded member as claimed in claim 1, wherein the threaded member is a bolt having a head section and a threaded rod section disposed under a bottom face of the head section, the thread being formed on a circumference of the threaded rod section, the receiving space being inward recessed from a top face of the head section and extending to the threaded rod section; a cap body being disposed in the head section of the threaded member to block the top end of the receiving space as a top wall of the receiving space; the sensor serving to wiredly or wirelessly transmit data.

15. The threaded member as claimed in claim 2, wherein the threaded member is a bolt having a head section and a threaded rod section disposed under a bottom face of the head section, the thread being formed on a circumference of the threaded rod section, the receiving space being inward recessed from a top face of the head section and extending to the threaded rod section, a cap body being disposed in the head section of the threaded member to block the top end of the receiving space as a top wall of the receiving space, the sensor serving to wiredly or wirelessly transmit data.

16. The threaded member as claimed in claim 3, wherein the threaded member is a bolt having a head section and a threaded rod section disposed under a bottom face of the head section, the thread being formed on a circumference of the threaded rod section, the receiving space being inward recessed from a top face of the head section and extending to the threaded rod section, a cap body being disposed in the head section of the threaded member to block the top end of the receiving space as a top wall of the receiving space, the sensor serving to wiredly or wirelessly transmit data.

17. The threaded member as claimed in claim 14, wherein the sensor component further includes an upper contact member and a lower contact member; a top end and a bottom end of the flexible member being respectively connected with the upper and lower contact members; the upper contact member abutting against the cap body; the lower contact member abutting against a bottom wall of the receiving space.

18. The threaded member as claimed in claim 15, wherein the sensor component further includes an upper contact member and a lower contact member; a top end and a bottom end of the flexible member being respectively connected with the upper and lower contact members; the upper contact member abutting against the cap body; the lower contact member abutting against a bottom wall of the receiving space.

19. The threaded member as claimed in claim 16, wherein the sensor component further includes an upper contact member and a lower contact member; a top end and a bottom end of the flexible member being respectively connected with the upper and lower contact members; the upper contact member abutting against the cap body; the lower contact member abutting against a bottom wall of the receiving space.

* * * * *